UNITED STATES PATENT OFFICE.

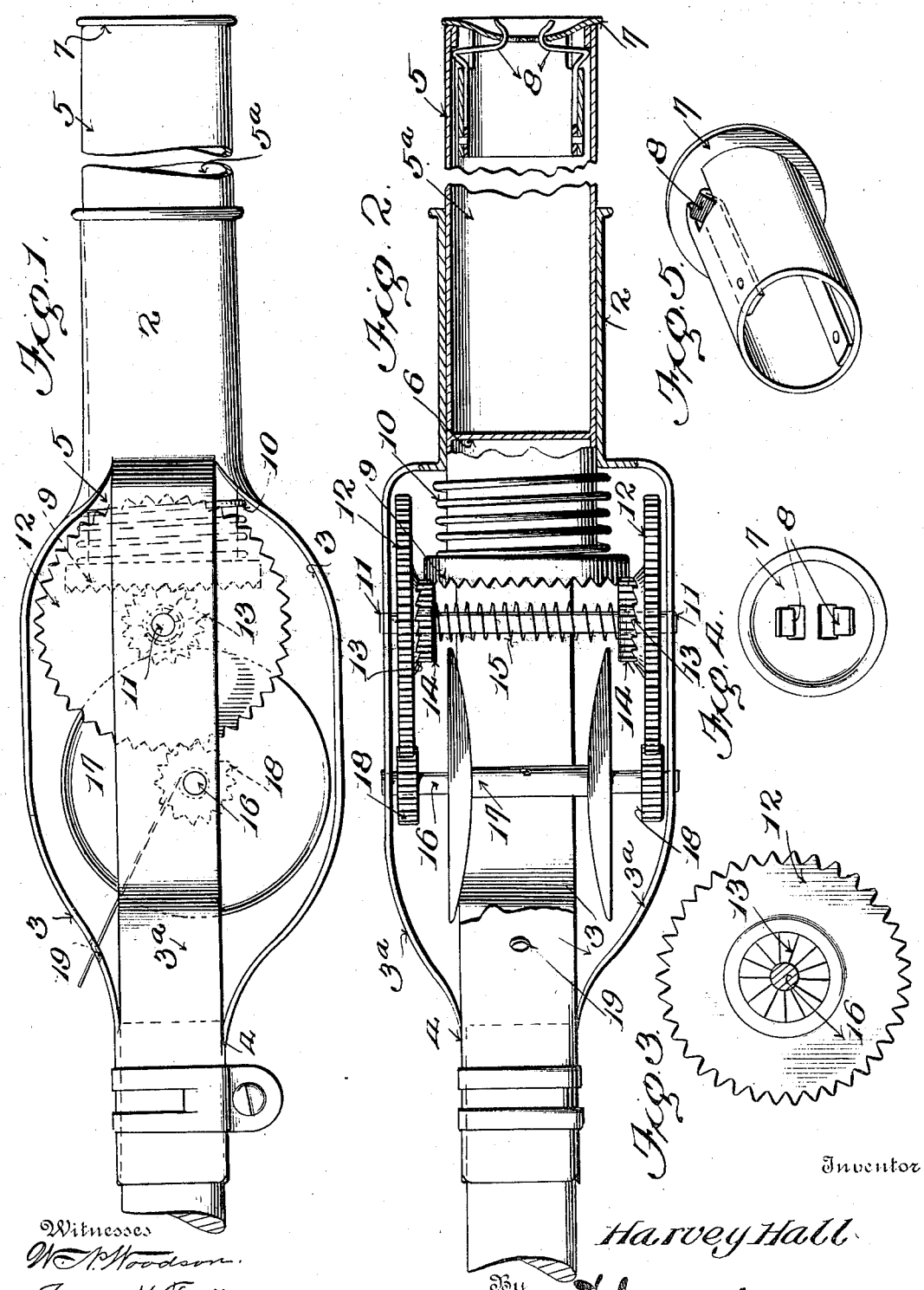

HARVEY HALL, OF PAONIA, COLORADO.

REEL.

977,732.  Specification of Letters Patent.  Patented Dec. 6, 1910.

Application filed August 28, 1909. Serial No. 515,077.

*To all whom it may concern:*

Be it known that I, HARVEY HALL, a citizen of the United States, residing at Paonia, in the county of Delta and State of Colorado, have invented certain new and useful Improvements in Reels, of which the following is a specification.

My invention relates to reels adapted to be applied to fishing rods, and particularly to a reel having gearing whereby it may be rotated to wind up the fishing line by a rotary motion of a handle forming the butt end of the rod, the device having means, however, whereby the reel may be disengaged from its gearing so as to run free when desired.

The invention includes, generally speaking, a handle adapted to be applied over the butt end of a rod, said handle being hollow at its end so as to contain flies, hooks, etc. and provided with a cover. The reel proper is supported on the handle, and has gears upon it which mesh with opposed gears mounted on a counter-shaft also supported on the handle. When the sleeve is rotated in either direction it will engage with loose gears and these will rotate in opposite directions, the ratchet teeth on one of the other of the gears, however, engaging with the reel gears to wind up the line. The actuating rotatable sleeve, however, is slidably mounted so that it can be withdrawn out of engagement with the loose gears so that the line may be easily unwound from the reel.

For a full understanding of the invention reference is to be had to the following description and accompanying drawings, in which:—

Figure 1 is a side elevation of my improved handle and reel. Fig. 2 is a top view thereof partly in section to show the mechanism of the reel. Fig. 3 is an inside face view of one of the operating gears. Fig. 4 is an end view of the cap closing the hollow handle. Fig. 5 is a perspective view of the same.

Corresponding and like parts are referred to in the following description and indicated in all the views of the drawings by the same reference characters.

Referring to the drawing 2 designates a tubular body portion having attached thereto or formed therewith the side-pieces 3 which extend forward and protect the reel mechanism proper and are then contracted to form fingers 4 which are adapted to be clamped upon the butt end of a rod.

While I have shown and described this device as being an auxiliary handle and adapted to be clamped upon a rod, it will be understood, of course that the rod and handle might be permanently attached to each other.

Carried within the tubular body 2 is the rotatable tubular sleeve like handle 5 which is closed at its inner end by a partition 6 and at its outer end is provided with a closing cap 7. This cap may be attached to the sleeve 2 in any desired manner and provided with any suitable spring catch for holding it closed, but as shown the cap is cylindrical and fits within the tubular sleeve, it being provided at one end with an outwardly projecting flange engaging with the end of the sleeve. The cylindrical portion of the cap is cut away on each side to form openings for spring tongues 8 which project out slightly so as to engage with the inside face of the sleeve and frictionally hold the cap in place, said tongues being riveted to the inside of the cap. The ends of these spring tongues are inwardly bent, and the rearwardly bent ends project out through the end of the cap so that they may be readily grasped by the fingers and forced toward each other, thus retracting the tongues to permit the cap to be withdrawn. This hollow butt end of my device forms a receptacle $5^a$ wherein bait, flies, hooks and other such matters may be carried.

The inner extremity of the sleeve is formed with inwardly projecting teeth 9 and a spiral spring 10 surrounds the upper end of the sleeve and bears against a shoulder formed thereon and against the end of the body 2 to force the sleeve inward. Mounted in the opposed sides $3^a$ is the counter-shaft 11 which carries upon it the opposed pinions 12, the inside faces of these pinions being provided with ratchet teeth 13. Loosely mounted on the counter-shaft 11 are the opposed toothed gears 14 which are adapted to engage with the teeth on the end of the sleeve 5 so that when the sleeve is rotated in either direction the loose gears 14 will be rotated in opposite directions to each other. These loose gears are formed on their outer faces with oppositely inclined ratchet teeth which engage with the ratchet teeth formed on the inner faces of the pinions 12. Hence when the gears 14 rotate in one direction, one of them will engage with its contiguous pinion, while the other will slip over the face of its contiguous pinion. A spring 15 surrounding the counter-shaft acts to force the loose gears into engagement with their respective pinions. Mounted in the side pieces 3ª is the reel shaft 16 carrying upon it the reel 17 of any usual or desired construction. This reel shaft has mounted on it the opposed pinions 18 which engage with the pinions 12, thus when the sleeve 5 is rotated in either direction, the reel will be rotated in a direction to wind up the line thereon, thus a reciprocating rotary motion of the sleeve 5 gives a continuous winding motion to the reel.

It will be seen that by withdrawing the sleeve 5 against the force of the spring 10, the teeth 9 will be disengaged from the loose gears 14, and that thus the reel will be free to unwind. If the rod to which this handle is connected is a solid rod, the fishing line on the reel will be taken off the reel through an eye or opening 19 formed on one of the side-pieces 3. If, however, the rod is a hollow rod, the line can be taken directly off the reel and into the tubular butt end of the rod.

The operation of my device will be obvious. By rotating the sleeve 5 in either direction, the shaft 11 will be actuated in one direction, and through its gear will rotate the reel shaft, thus winding up the line. If it is desired to allow the line to be unreeled, as when hooking a game fish, it is only necessary to pull back on the sleeve 5 and to let the fish run free.

It will be obvious that the line may be reeled up or let out at will, and that perfect control is had over the fish at all times.

Attention may be called to the fact the hands of the operator are not required to be moved from the rod in order to actuate the reel. The hands are always in proper position for manipulating the rod and at the same time have entire control over the reel mechanism. The double action of the sleeve 5 permits of a very rapid reeling up of the line and is particularly useful in fighting game fishes where it is desired that all motion shall count.

My construction is simple, and relatively cheap. The construction is of metal, and therefore not likely to be damaged by dampness, and the reeling mechanism being inclosed, there is small chance of its becoming damaged.

While I have shown what I believe to be the preferred embodiment of my invention, it is to be understood, of course, that I do not wish to be limited to the details of construction or the exact arrangement of the parts, as it is obvious that the arrangement of these parts and form thereof, might be changed in many ways without departing from the spirit of the invention.

Having thus described the invention what is claimed as new is:—

1. The combination with a fishing rod, of a hollow handle, a rotatable sleeve mounted in the handle and adapted to be rotated independently thereof, said sleeve having gear teeth at its inner end, a transverse shaft on the handle, loose pinions on said shaft engaged by the gear teeth of the sleeve, a reel mounted on the handle, and means operatively connecting the said pinions and the reel whereby the latter may be operated upon a rotation of the former.

2. The combination with a fishing reel, of a handle, a rotatable sleeve concentric with and mounted interiorly of the handle and longitudinally shiftable therein, said sleeve having an annular series of gear teeth at one end extending parallel to the axis of the sleeve, a counter-shaft extending transversely of the handle, a pinion on the shaft engaging with the gear teeth on the sleeve, a transverse reel-shaft mounted in the handle, a reel thereon, and multiplying gears between said pinion and the reel-shaft.

3. The combination with a fishing reel, of a handle, a rotatable sleeve concentric with and mounted interiorly of the handle and longitudinally shiftable therein, said sleeve having an annular series of gear teeth at one end extending parallel to the axis of the sleeve, a counter-shaft disposed transversely of the handle, oppositely disposed loose pinions on the counter-shaft adapted to be engaged with the gear teeth on the sleeve when the sleeve is forced inward, a transversely extending reel-shaft mounted on the handle, a reel thereon, multiplying gearing between said pinions and the reel-shaft, and yielding means normally holding the longitudinally movable sleeve into engagement with the pinions.

4. In a fishing reel, a handle adapted to receive the butt end of a fishing rod, a rotatable sleeve therein, having teeth at one end, a shaft mounted in said handle transverse to the axis thereof, pinions on the shaft meshing with the teeth on said sleeve, gear wheels mounted on the shaft, clutch mechanisms between the gear wheels and said pinions operating in reverse directions to each other, a reel mounted on the handle and gear wheels on the shaft of the reel engaging with the first named gear wheels.

5. The combination with a fishing rod, of a handle therefor comprising a body portion having forwardly projecting sides engaging with the fishing rod, a rotatable sleeve mounted in the body portion, said sleeve being toothed at one end, springs forcing said sleeve inward, a counter-shaft mounted in the handle, loose gears on the counter-shaft having their outer faces formed with rigid teeth, the teeth of one gear being oppositely inclined to the teeth of the other, pinions mounted on said shaft, the inside faces of the pinions being formed with rigid teeth engaging with the teeth on said loose gears, a reel mounted thereon and gears on said reel, a shaft engaging with the pinions on the counter-shaft.

6. A handle for fishing rods comprising a body portion having a tubular end, a rotatable sleeve carried within the tubular end, said sleeve being toothed at its inner extremity, a counter-shaft mounted in the handle and carrying opposed pinions, each of said pinions being provided with inwardly projecting ratchet teeth, the teeth of one pinion being oppositely inclined with the teeth of the other, loose gears mounted on said counter-shaft and engaging with the toothed end of the rotatable sleeve, said gears on their outer faces having ratchet teeth engageable with the ratchet teeth on the inside faces of the pinions, a spring for forcing said loose gears outward and into engagement with the pinions, a reel shaft, a reel thereon and gears mounted on the reel engaging with the pinions of the counter-shaft.

7. In a fishing reel, a handle adapted to receive the butt end of a fishing rod, a rotatable sleeve mounted interiorly of the handle and extending out at one end thereof, said sleeve at its other end being provided with an annular series of teeth, a spring engaging with the sleeve and handle, a transverse shaft mounted on the handle, a pinion on said shaft with which the teeth on the sleeve are forced into engagement by said spring, a gear wheel carried on said shaft, a reel, a shaft on which it is mounted, and a pinion on the reel shaft engaged by said gear wheel on the pinion shaft.

8. A handle for fishing rods comprising a body portion having a tubular end, said body portion being contracted at the end opposite to said tubular portion adapted to engage the butt end of a fishing rod, a clamp for holding the body portion in engagement with the fishing rod, a rotatable sleeve carried within the tubular end and projecting out at one end thereof, said sleeve being formed with an annular series of teeth at its inner extremity, a transverse shaft mounted in the handle and carrying opposed pinions, loose gears mounted on said countershaft and engaging with the shaft end of the rotatable sleeve, oppositely acting clutch mechanisms between said pinions and the loose gears, a spring for forcing said loose gears into engagement with the pinions, a reel shaft, a reel thereon, and gears mounted on the reel and engaging with the pinions of the countershaft.

In testimony whereof I affix my signature in presence of two witnesses.

HARVEY HALL. [L. S.]

Witnesses:
C. T. RULE,
A. WINN.